United States Patent

Wyde et al.

[11] Patent Number: 6,138,222
[45] Date of Patent: Oct. 24, 2000

[54] ACCESSING HIGH CAPACITY STORAGE DEVICES

[75] Inventors: Joshua S. Wyde, Tomball; John Johann, Houston, both of Tex.

[73] Assignee: Compaq Computer Corporation, Houston, Tex.

[21] Appl. No.: 08/990,400

[22] Filed: Dec. 15, 1997

[51] Int. Cl.$^7$ ..................................................... G06F 12/00

[52] U.S. Cl. .............................. 711/172; 711/4; 711/111; 711/112; 711/170

[58] Field of Search ................................ 711/4, 111, 112, 711/170, 172; 395/839, 700; 360/49; 345/352

[56] References Cited

U.S. PATENT DOCUMENTS

| | | | |
|---|---|---|---|
| 5,721,952 | 2/1998 | Lin et al. | 710/19 |
| 5,745,115 | 4/1998 | Purple et al. | 345/352 |
| 5,757,568 | 5/1998 | Greenberg et al. | 360/49 |

OTHER PUBLICATIONS

"Information Technology–Enhanced BIOS Services For Disk Drives", Working Draft, T13, 1226DT, Revision 7, Oct. 23 1997.

*Information Technology—Enhanced BIOS Services For Disk Drives,* Working Draft, T13, 1226DT, REvision 7, Oct. 23, 1997.

*Primary Examiner*—John W. Cabeca
*Assistant Examiner*—Brian R. Peugh

*Attorney, Agent, or Firm*—Conley, Rose & Tayon, P.C.; Michael F. Heim; Jonathan M. Harris

[57] ABSTRACT

A computer system includes a non-removable disk drive that has a capacity that may exceed 7.875 GB. The computer system generally includes a processor, a disk drive controller, a display, an input device, and a non-volatile memory device that includes firmware that is executed during system initialization. The storage capacity of the drive is reported by the drive in terms of numbers of cylinders, sectors, and heads during system initialization. In response, the firmware informs the operating system of the capacity of the drive. The firmware translates the reported cylinder and head numbers. If the reported capacity of the drive is equal to or greater than 4,032 gigabytes, the firmware limits the number of heads reported by the drive to a predetermined value. In accordance with another aspect of the invention, the capacity reported by the drive is compared to a threshold value. If the reported capacity is less than the threshold value, the firmware informs the operating system of the highest head number reported by the drive. If, however, the reported capacity is greater than or equal to the threshold value, the firmware reconfigures the drive to use a number of heads that is less than the number of heads the drive initially reported. In the latter situation (capacity greater than the threshold value) the computer's operating system and firmware preferably implement a service to permit access to the drive's full capacity. Another aspect of the invention permits a computer's operating system that cannot access the fall capacity of a drive greater than 7.875 GB to fully access the first 7.875 GB of the drive by limiting the number of cylinders to 16,383 cylinders.

14 Claims, 4 Drawing Sheets

FIG.1

| CYL. | HEAD | SECTOR |
|---|---|---|
| 0 | 0 | 0 |
|  |  | 1 |
|  |  | ⋮ |
|  |  | 63 |
|  | 1 | 0 |
|  |  | 1 |
|  |  | ⋮ |
|  |  | 63 |
|  | ⋮ |  |
|  | 255 | 0 |
|  |  | 1 |
|  |  | ⋮ |
|  |  | 63 |
| 1 | 0 | 0 |
|  |  | 1 |
|  |  | ⋮ |
|  |  | 63 |
|  | 1 | 0 |
|  |  | 1 |
|  |  | ⋮ |
|  |  | 63 |
|  | ⋮ |  |
|  | 255 | 0 |
|  |  | 1 |
|  |  | ⋮ |
|  |  | 63 |
| ⋮ |  |  |
| 1023 | 0 | 0 |
|  |  | 1 |
|  |  | ⋮ |
|  |  | 63 |
|  | 1 | 0 |
|  |  | 1 |
|  |  | ⋮ |
|  |  | 63 |
|  | ⋮ |  |
|  | 255 | 0 |
|  |  | 1 |
|  |  | ⋮ |
|  |  | 63 |

FIG.2

| CYL. | HEAD | SECTOR |
|---|---|---|
| 0 | 0 | 1 |
|  |  | 2 |
|  |  | ⋮ |
|  |  | 63 |
|  | 1 | 1 |
|  |  | 2 |
|  |  | ⋮ |
|  |  | 63 |
|  | ⋮ |  |
|  | 15 | 1 |
|  |  | 2 |
|  |  | ⋮ |
|  |  | 63 |
| 1 | 0 | 1 |
|  |  | 2 |
|  |  | ⋮ |
|  |  | 63 |
|  | 1 | 1 |
|  |  | 2 |
|  |  | ⋮ |
|  |  | 63 |
|  | ⋮ |  |
|  | 15 | 1 |
|  |  | 2 |
|  |  | ⋮ |
|  |  | 63 |
| ⋮ |  |  |
| 1023 | 0 | 1 |
|  |  | 2 |
|  |  | ⋮ |
|  |  | 63 |
|  | 1 | 1 |
|  |  | 2 |
|  |  | ⋮ |
|  |  | 63 |
|  | ⋮ |  |
|  | 15 | 1 |
|  |  | 2 |
|  |  | ⋮ |
|  |  | 63 |

FIG.3a

| BEFORE TRANSLATION | |
|---|---|
| CYLINDER | HEAD |
| 0 | 0h |
| | 1h |
| | ⋮ |
| | Fh |
| 1 | 0h |
| | 1h |
| | ⋮ |
| | Fh |
| 2 | 0h |
| | 1h |
| | ⋮ |
| | Fh |
| 3 | 0h |
| | 1h |
| | ⋮ |
| | Fh |
| ⋮ | |
| FFCh | 0h |
| | 1h |
| | ⋮ |
| | Fh |
| FFDh | 0h |
| | 1h |
| | ⋮ |
| | Fh |
| FFEh | 0h |
| | 1h |
| | ⋮ |
| | Fh |
| FFFh | 0h |
| | 1h |
| | ⋮ |
| | Fh |

FIG.3b

| AFTER TRANSLATION | |
|---|---|
| CYLINDER | HEAD |
| 0h | 0h |
| | 1h |
| | ⋮ |
| | Fh |
| | 10h |
| | 11h |
| | ⋮ |
| | 1Fh |
| | 20h |
| | 21h |
| | ⋮ |
| | 2Fh |
| | 30h |
| | 31h |
| | ⋮ |
| | 3Fh |
| ⋮ | |
| 3FFh | 0h |
| | 1h |
| | ⋮ |
| | Fh |
| | 10h |
| | 11h |
| | ⋮ |
| | 1Fh |
| | 20h |
| | 21h |
| | ⋮ |
| | 2Fh |
| | 30h |
| | 31h |
| | ⋮ |
| | 3Fh |

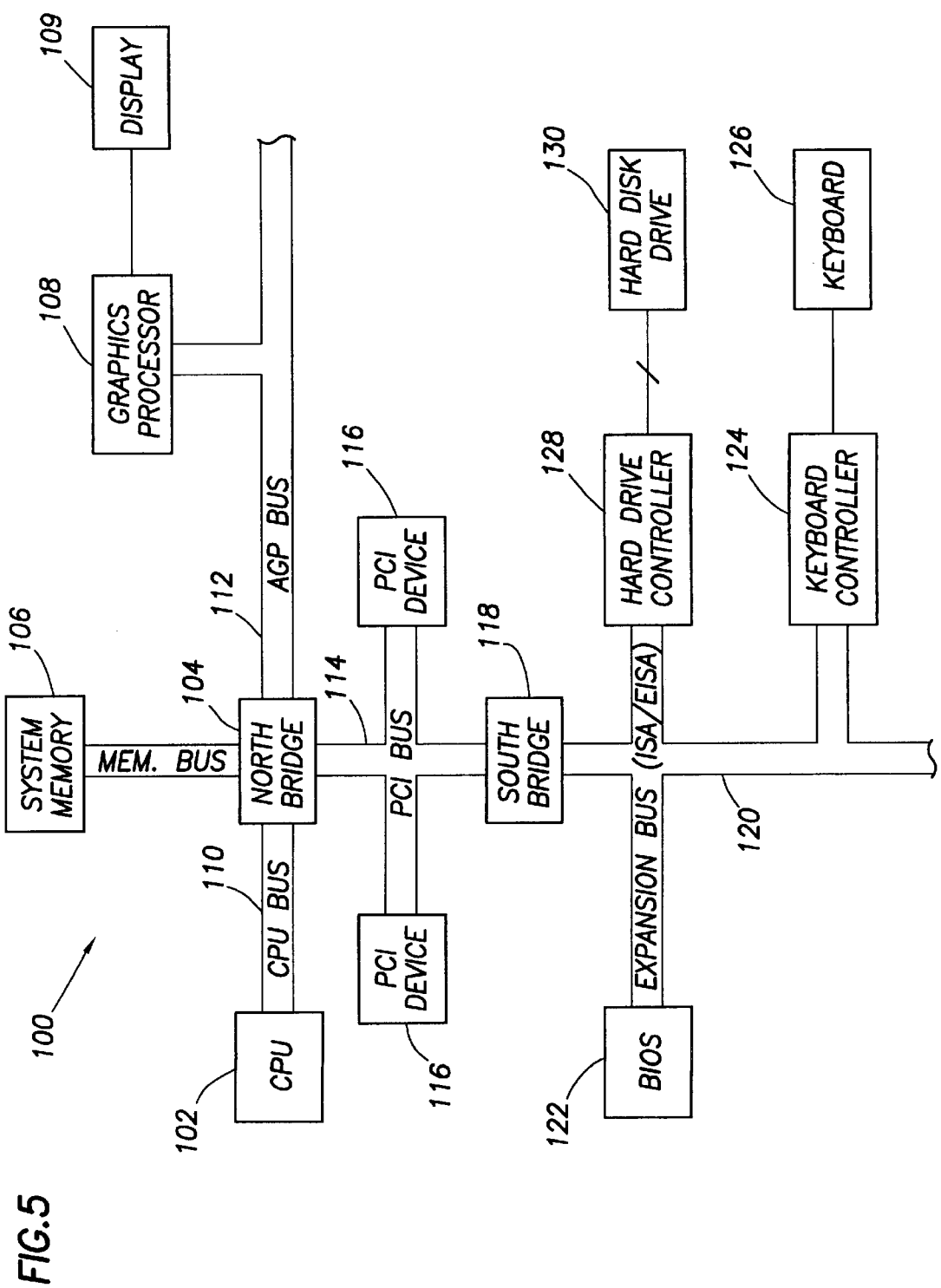

ACCESSING HIGH CAPACITY STORAGE DEVICES

BACKGROUND OF THE INVENTION

CROSS-REFERENCE TO RELATED APPLICATIONS

Not Applicable.

STATEMENT REGARDING FEDERALLY SPONSORED RESEARCH OR DEVELOPMENT

Not Applicable.

1Field of the Invention

The present invention relates generally to personal computers with non-removable storage media such as hard disk drives. Still more particularly, the invention relates to accessing high capacity disk drives and in particular disk drives with more than four gigabytes of storage capacity.

2. Background of the Invention

As mass storage for the personal computer has increased in size the mechanisms for passing information and controlling the storage devices have become limiting and problematic for those wishing to expand capacity. The original mechanisms for accessing (also referred to generally as "addressing") early storage units imposed an upper limit on the size or capacity of the storage units. Various addressing techniques were implemented to permit expansion beyond the original ostensible limits, but merely pushed the original upper limit to a new, although larger, upper limit. Mass storage unit manufacturers now desire to make storage units that exceed the present upper limit on capacity. In response, new techniques for addressing these larger storage units are needed that either remove the upper limit on storage capacity altogether or raise the limit to a much higher level.

To fully understand the new mass storage addressing techniques a review of the original addressing techniques is necessary. To this end, the following discussion describes the original addressing scheme as well as modifications to that scheme that were required to permit higher capacity storage units. With that background, the reason for the present limit on storage unit capacity can be understood. This disclosure is intended to apply broadly to any non-removable, mass storage unit, but may be described throughout in terms of a hard disk drive.

Before beginning several preliminary points need to be made. First, many of the numbers included in this disclosure are followed by the letter "h." The letter "h" refers to the hexadecimal or base-16 number system. The hexadecimal system includes 16 characters including the alpha-numeric characters 0–9 and A–F. For example, 10 h is the hexadecimal representation of the number 16 in the conventional, base-10 number system. Decimal, or base-10, numbers are indicated with either a "d" suffix or no suffix at all.

Additionally, the following discussion generally explains how hard disk drives are structured in terms of "cylinders," "heads," and "sectors." It should be noted that when describing the numbers of cylinders, heads, and sectors one must be aware of the particularly numbering scheme used—0-based or 1-base numbering. A 0-based numbering scheme begins with 0 while a 1-based numbering scheme begins counting with 1. For illustrative purposes consider cylinders which are referred to in a 0-based scheme. A hard disk drive may have, for example, 400 h cylinders. This is equivalent to saying that the last or highest cylinder number is 3 FFh. This is true because cylinders are 0 based. That is, 0 is a valid address for a cylinder. So to say that a drive has 400 h addressable cylinders is to say that it has cylinders numbered 0–3FFh. To say that a drive has 20 h sectors, on the other hand, is equivalent of saying that the last or highest numbered cylinder is 20 h. This is so because sectors are described with a 1-based number system. That is, 0 is not a valid address. So to say that a drive has 20 h sectors is to say that you can address sectors 1–20 h. Throughout this disclosure sectors are represented with a 1- based value, while cylinders and heads are represented with a 0-based value.

Hard disk drives are usually accessed through the Basic Input/Output System ("BIOS") included on the main circuit board (also referred to as the "mother" board) of most computers. The BIOS is firmware embedded on a memory chip, such as a read only memory ("ROM"), that performs a number of low-level functions. For example, the BIOS executes the power on self test ("POST") during system initialization ("boot up"). The BIOS also is responsible for loading the operating system into the computer's main system memory. Further, the BIOS handles the low-level input/output transactions to the various peripheral devices such as the hard disk drive. It is thus with the assistance of the BIOS that a hard drive is addressed for storing new data (writing) or retrieving stored data (reading).

A device or software desiring support from the BIOS accesses its functions by initiating interrupt requests. Interrupt number 13 (referred to throughout this disclosure as simply "INT 13") provides the functions necessary to address both floppy and hard disk drives. A number of programmable registers are also available and are used in conjunction with INT 13. These registers include AH, CH, CL, DH, and DL and usually are eight-bit registers. A hard drive is addressed by loading these registers with information related to the portion of the drive targeted for a read or write transaction and issuing an INT 13 request. Either the computer's operating system or an application program can issue the INT 13 request to access the drive.

Originally, hard drives were structured as combination of cylinders, heads, and sectors. Each cylinder includes a fixed number of heads. Each head includes a fixed number of sectors. Each sector contains 512 bytes. Thus, the maximum capacity of the drive (measured in units of bytes) can be computed by multiplying together the number of cylinders, heads, and sectors and then multiplying that result by 512 bytes.

The size of the hard drive is usually ascertained during the initialization process ("boot up"). The computer's processor begins executing the POST code included as part of the BIOS. One of the steps performed during the POST is to poll the hard drive to request its capacity information. In response to receiving the capacity request command from BIOS, the hard drive reports the total number of cylinders, heads, and sectors. BIOS then loads the operating system which initiates an INT 13 request to BIOS to request the hard drive's capacity. In response, BIOS informs the operating system of the drive's maximum, or highest numbered, addressable cylinder, head, and sector.

To read or write data to a particular portion of the drive required knowing the cylinder, head and sector addresses of the desired portion. Once these values were determined, the hard drive was addressed by loading a cylinder number, a head number and a sector number into the CH, CL, DI, and DL registers. The BIOS permits the cylinder number to include 10 bits, the head number to include 8 bits, and the sector number to include 6 bits. These values are stored into the registers as follows:

CH specifies cylinder bits <7..0>

CL<7..6> is cylinder bits <9..8>

CL<5..0> specifies sector

DH specifies the head

DL specifies the drive number

Where <x..y> indicates bits x through y in the relevant register.

This method of addressing a sector on a hard drive via Cylinder/Head/Sector values is called "CHS addressing". The drive number loaded into the DL register permits multiple disk drives to be connected to the computer and addressed individually. Because the registers CH, CL and DH have a fixed number of bits for storing the numbers of cylinders, heads, and sectors, the size of the disk drive is limited. Table 1 below lists the maximum number of cylinders, heads, and sectors based solely on the register size restrictions.

TABLE 1

Limit on maximum drive size as a result of BIOS INT 13 register sizes

| Item | Register | Number of bits | Maximum Size (HEX) | Maximum Size (DEC) |
|---|---|---|---|---|
| Cylinder | CL <7:6> CH <7:0> | 10 | 400h (0–3FFh) | 1024 (0–1023) |
| Sector | CL <5:0> | 6 | 40h (0–3Fh) | 64 (0–63) |
| Head | DH | 8 | 100h (0–FFh) | 256 (0–255) |

The relationship between cylinders, sectors, and heads can be visualized with respect to FIG. 1. For each cylinder, which ranges from cylinder 0 to cylinder 1023, the heads range from 0 to 255. Further, for each head, the sectors range from 0 to 63.

The size of the registers, however, is not the only restriction for hard disk drives. Most, if not all, hard disk drives are designed to comply with an industry standard called Advanced Technology Attachment ("ATA"). The ATA standard ensures the compatibility between hard drives and computers. The ATA standard is also referred to as the Intelligent Drive Electronics ("IDE") standard and drives that comply with the ATA standard are often referred to as IDE drives. Per the ATA-4 specification (ATA revision 17, Oct. 17, 1997), only four bits are available for addressing a head. The ATA specification also specifies that the sector field is one-based (i.e., it begins numbering with 1, not 0). Thus, a sector of 0 is invalid. This means that although the operating system and BIOS (via INT 13) may be able to pass up to 100 h heads and 40 h sectors, the host may only address 42 or 10 h (0-Fh) heads and 3Fh (1-3Fh) sectors. Because the maximum numbered head returned to the operating system via INT 13 is based on being the first addressable head, the operating system adds one to the highest numbered head to calculate the total number of heads registers combined with the restrictions imposed by the ATA specification leads to the limits for hard drives shown in Table 2.

TABLE 2

Hard drive maximums considering Int13 and ATA restrictions

| Item | Register | Bits | Maximum Size (Hexamdecimal) | Maximum Size (Decimal) |
|---|---|---|---|---|
| Cylinder | CL <7:6> CH <7:0> | 10 | 400 (0–3FF) | 1024 (0–1023) |

TABLE 2-continued

Hard drive maximums considering Int13 and ATA restrictions

| Item | Register | Bits | Maximum Size (Hexamdecimal) | Maximum Size (Decimal) |
|---|---|---|---|---|
| Sector | CL <5:0> | 6 | 3F (1–3F) | 63 (1–63) |
| Head | DH | 4 | 10 (0-F) | 16-(0–15) |

The ATA specification requires that the drive layout should be visualized as seen in FIG. 2. That is, when a drive reports 10 h heads, it is interpreted as 10 h heads per cylinder, and when a drive reports 3 Fh sectors it is interpreted as 3Fh sectors per head. In FIG. 2, the cylinder number still ranges from 0 to 1023, but the head number for each cylinder only ranges from 0 to 15, not 0 to 255 as in FIG. 1. Further, the sector number for each head ranges from 1 to 63, instead of 0 to 63 as in FIG. 1.

The number of sectors that can be addressed is the product of the number of cylinders, heads per cylinder, and sectors per head. This leads to the maximum number of sectors that can be addressed being (1024d)(63d)(16d)=1,032,192d sectors. Given that there are 512 d bytes per sector (or alternatively 200 h bytes per sector), then the original hard drive addressing scheme supported a maximum capacity of (512 d bytes)(1,032,192 d sectors) =528,482,304 bytes that are addressable. Alternatively stated, the maximum number of addressable bytes is 504 MB. The "MB" designation indicates megabytes. One megabyte (1 MB) is $1024^2$ or 1,048,576 bytes.

The 504 MB limit was out grown some time ago and an alternative addressing scheme was necessary to overcome this original limit. The alternative addressing scheme involves a 20 translation process as described below. After reviewing the original data passing scheme it was noted that the limits on the heads that can be addressed is strictly a function of the drive register.

That is, although the BIOS and operating system have one byte (i.e., eight bits) allocated for passing the head number, only four bits could be used as the ATA specification permits only four bits to be allocated for the head number. On the other hand, the ATA specification permitted the cylinder number to surpass the 10 bit limitation imposed by the INT 13 register convention. These observations lead to a translation scheme to overcome the limits placed on hard drive access that involved allowing more than the 10 bit cylinder limit, but shifting the cylinder number bit-wise to the right (which is equivalent to dividing consecutively by 2) and correspondingly shifting the head number bit-wise to the left proportionally (which is equivalent to multiplying consecutively by 2). The cylinder and head numbers were bit shifted until the cylinder number complied with the 10 bit limitation imposed by INT 13.

To illustrate this translation scheme, suppose that a drive reports the parameters reported in Table 3 to BIOS during boot up. When a drive reports parameters it usually reports the total number of heads, cylinders, and sectors, not the highest (last) numbered head, cylinder, and sector. This convention is maintained here.

TABLE 3

Parameters reported by hard drive to host computer

|  | Cylinders | Sectors | Heads |
|---|---|---|---|
| Reported | 1000h | 3Fh | 10h |
| Last | FFFh | 3Fh | Fh |

The drive described in Table 3 includes a capacity of (1000 h)(3Fh)(10 h)(200 h) or 2016 MB. This drive is thus four times larger than the 504 MB limit. However, the BIOS code translates these parameters according to the following algorithm:

1. Shift the reported number of cylinders right by one bit;
2. Shift the reported number of head left by one bit;
3. If the number of cylinders after shifting is less than 400 h stop; repeat steps 1 and 2;
4. At this point the number of translated cylinders is called $C_T$ and the number of translated heads is called $H_T$, with a maximum logically addressable head of $H_M = H_T - 1$ and a maximum logically addressable cylinder of $C_M = C_T - 1$.

Thus, bit shifting occurs according to steps 1 and 2 until the number of cylinders is less than 400 h in step 3. The 400 h value represents the maximum number of cylinders that can be represented with a 10 bit value (000 h - 3 FFh).

Using this algorithm the reported number of cylinders in the example of Table 3, 1000 h, must be bit shifted to the right twice to permit the number of cylinders to be able to fit within the 10 bit limitation (i.e., under maximum of 400 h total cylinders or 0–3 FFh addressable cylinders). Therefore, the head number is shifted left twice to compensate resulting in 40 h heads (0–3 Fh addressable). FIG. 3 shows graphically how this translation may be visualized before and after translation.

The sectors are not shown in FIG. 3 because they are unaffected by this translation scheme. Accordingly, there are 3 Fh (63 d) sectors per head before and after translation. The only difference is how the sectors are logically addressed. The distinction of logically addressed versus physically addressed being that one can not physically address head 3 Fh (which is a six bit number) as there are only four address lines for the head II under the ATA specification.

The BIOS, which initially translated the reported capacity parameters, must undo the translation process before passing the CHS address to the drive when accessing a targeted portion of the drive for reading or writing data. Table 4 contains the values for the heads, cylinders, and sectors before and after translation.

TABLE 4

Parameters addressable before and after the translation process

|  | Highest Cylinder # | Highest Sector # | Highest Head # |
|---|---|---|---|
| Before Translation | FFFh | 3Fh | Fh |
| After Translation | 3FFh (Logical) | 3Fh | 3Fh (Logical) |

It is important to note that to change a logical CHS address to a physical CHS address, it is not simply a matter of reversing the translation process. To simply shift the cylinders left by two bits and the heads right by two bits may result in the loss of information which would cause aliasing. For example, using the theoretical drive parameters given in Table 3, take the post-translation addresses $C_1H_0S_3$ and $C_1H_3S_3$. The subscripts indicate the cylinder, head and sector numbers. Thus, $C_1H_0S_3$ designates cylinder number 1, head 0 and sector number 3. After reversing the translation process by reversing the shifting process described above, the lower two bits of the head number are lost. Both addresses result in the untranslated physical address of $C_4H_0S_3$. This is clearly unacceptable. The proper method for undoing the translation without loss of information is:

1. Shift the cylinder number left by the amount shifted right originally. Let this result be $C_1$;
2. Divide the translated head number by the number of pre-translated heads. At this point let the remainder be $T_r$ and the quotient be $T_q$;
3. Let $T_r$ be the physical head;
4. Let $C_1 + T_q$ be the physical cylinder;
5. The sector number remains the same.

Armed with this information, one can now look at the new theoretical maximum drive size using this translation technique. Starting with the maximums given in Table 2, original limits imposed by INT 13 and ATA specification, and shifting the most that one can shift the head value left and stay within the byte allocated for passing the head (i.e., 4 bit shifts to the left), the result is a cylinder count of 4000 h (0–3 FFFh addressable). The maximum number of heads is set at 10 h (0 -Fh addressable) by the drive controller register and sectors are not involved in the translation so they have the same maximum as before translation, namely 3Fh. This leads to the maximums shown below in Table 5.

TABLE 5

Maximum drive parameters before and after translation

|  | Highest Addressable Cylinder | Highest Addressable Sector | Highest Addressable Read |
|---|---|---|---|
| Max. before translation | 3FFFh | 3Fh | Fh |
| Maximum After Translation | 3FFh (Logical) | 3Fh | FFh (Logical) |

The translation scheme described above overcame the 504 MB barrier created by the original addressing scheme, but imposes a new, albeit higher, barrier. The new limit became (400 h cylinders)(3 Fh sectors)(100 h heads)(200 h bytes per sector)=7.875 GB, where "GB" refers to gigabytes wherein 1 GB=$1024^3$ or 1,073,741,824 bytes.

Until recently, translation has been sufficient to handle larger and larger drives. 40 However, two problems result from this translation scheme. The first problem occurs with respect to particular operating systems. At the 4,032 MB demarcation the number of cylinders reported by the drive is 2000 h (0–1 FFFh addressable). This causes the translation process to calculate 1OOh heads (0-FFh addressable heads). It was found that with Window® 95 and other operating systems, when the highest addressable head number of FFh is returned to the operating system via INT 13, the operating system performs calculations based on the total number of heads. Because the highest numbered head returned to the operating system via INT 13 is based on 0 h being the first addressable head, the operating system adds one to the highest numbered head to calculate the total number of heads. However, such operating systems perform byte size math meaning that only eight bits are involved in the calculations; any carry over to a ninth bit is ignored. Adding 1 to FFh thus results in a value of 00 h heads which eventually causes a divide by 0 error. Dividing a number by 0 has an undefined result. Thus, when some computers, through their operating systems, attempt to access a hard drive's capacity in excess of 4,032 MB, divide-by-zero errors may occur.

An additional problem occurs when the computer attempts to access drives that have a capacity greater than 7.875 GB. In this case the drive may appear to vary between 3.93 GB and 7.875 GB depending on how many cylinders are reported. This result is illustrated graphically in FIG. 4. To see why this happens, consider a drive that reports 4000 h cylinders, 10 h heads, and 3 Fh sectors as in Table 7.

TABLE 7

Translation of Drive reporting 4000h Cylinders, 10h heads, and 3Fh sectors.

| Bit shifts | Number of Cylinders | Number of Heads | Drive Size |
|---|---|---|---|
|  | 4000h | 10h | 7.875 GB |
| 1st | 2000h | 20h | 7.875 GB |
| 2nd | 1000h | 40h | 7.875 GB |
| 3rd | 800h | 80h | 7.875 GB |
| 4th | 400h | 00h | 7.875 GB |

Following the translation method described above, this drive will be translated by shifting the reported cylinder number by four bits so that the cylinder number is within the 400 h limit. As shown, the head number (initially 10 h) is shifted to the left by four bits to a value of 100 h. Note that as the BIOS reports the highest head number to the operating system, the 00 heads will become FFh via INT 13.

Now consider a drive that reports 4010 h cylinders, 10 h heads, and 3 Fh sectors as seen in Table 8 below.

TABLE 8

Translation of Drive with 4010h Cylinders, 10h heads, and 3Fh Sectors

| Bit shifts | Cylinders | Heads | Size |
|---|---|---|---|
|  | 4010h | 10h | 7.88 GB |
| 1st | 2008h | 20h | 7.88 GB |
| 2nd | 1004h | 40h | 7.88 GB |
| 3rd | 802h | 80h | 7.88 GB |
| 4th | 401h | 00h | 7.88 GB |
| 5th | 200h | 00h | 3.93 GB |

This drive will require five shifts to get the cylinder number under 10 bits. The head number will remain at 00 h and will be reported as FFh to the operating system. If the operating system works at all, as it may have the divide-by-zero problem described previously, the drive will have an apparent capacity of only 3.93 GB. An increase of 16 d cylinders (from 4000 h to 4010 h) results in a loss in capacity of approximately 3.9 GB or 50% of the drive. The same apparent fluctuations in capacity can be demonstrated in a similar fashion for other cylinder numbers.

To solve this problem with drive capacities in excess of 7.875 GB, an extended INT 13 service is provided as part of the BIOS of many computers systems. Extended INT 13 is described in the Enhanced BIOS Services for Disk Drives specification (Rev. 7, Oct. 23, 1997), and is incorporated herein by reference. Generally, extended INT 13 accesses a hard drive using a 64 bit logical block address instead of the previous CHS address. The maximum addressable drive capacity using extended INT 13, and considering limits imposed by the ATA standard, is approximately 64 GB.

Most operating system's that support extended INT 13 also support the original or traditional INT 13 services to permit compatibility with BIOS's that do not provide extended INT 13. A hard drive must report at least 10 h heads to reach beyond the 7.875 GB barrier. During the boot-up process, the operating system of such computers normally issues a traditional INT 13 call to the BIOS to retrieve the drive's translated capacity information. As explained previously, however, a drive that reports 10 h heads will cause an operating system that issues a traditional INT 13 call to create a divide-by-zero error when the operating system converts the translated head number to a one-based number and performs byte size math. Consequently, some computers that use extended INT 13 to solve one problem (accessing capacity in excess of 7.875 GB) create the potential for another problem (divide-by-zero errors). Thus, a computer is needed that uses a hard drive accessing scheme to overcome the divide-by-zero problem, while permitting the use of the extended INT 13 service, if available, in the computer's BIOS.

The cyclical problem illustrated with respect to FIG. 4 is not solved in a computer whose BIOS does not include the extended INT 13 service. Such computers generally permit access to all 7.875 GB of a drive that only has 7.875 GB of capacity, but do not permit access to at least 7.876 GB of some drives with capacities in excess of 7.875 GB. For example, table 8 illustrates that a computer with a 7.88 GB drive, and that does not have extended INT 13, permits its operating system access to only 3.93 GB. Thus, the computer that solves the problems addressed above should also mitigate the loss of capacity problem of drives with capacities in excess of 7.875 6GB and that do not have extended INT 13.

Therefore, a computer system is needed that solves the problem address above. Despite the advantages such a system would provide, no such system is known to exist today.

SUMMARY OF THE INVENTION

The deficiencies of the prior art described above are solved in large part by a computer system that includes a non-removable disk drive, such as a hard disk drive, that has a capacity that may exceed 7.875 GB. The computer system generally includes a processor, a disk drive controller, a display, an input device, and a non-volatile memory device, such as a read only memory ("ROM"). The ROM includes firmware that is executed during system initialization. Part of the initialization process is to determine how many non-removable disk drives are attached to the computer system and the storage capacity of each drive. The storage capacity of each drive is reported by the drive in terms of numbers of cylinders, sectors, and heads during system initialization. After receiving the cylinder, head and sector numbers from each drive, the ROM firmware preferably informs the operating system of the capacity of the drives. The ROM firmware receives the number of cylinders, heads, and sectors reported by a drive during initialization and translates the cylinder and head numbers to translated cylinder and head values.

In accordance with one embodiment of the invention, if the reported capacity of the drive indicates the drive's capacity is equal to or greater than 4,032 gigabytes, the ROM firmware preferably limits the number of drive heads reported to the operating system to a predetermined value. The predetermined value preferably is less than the maximum number of heads that may be reported by a drive. More specifically, the predetermined head limit is one less than the total number of heads reported which is FF hexadecimal (255 decimal).

In accordance with another embodiment of the invention, the capacity reported by the drive is compared to a threshold value. If the reported capacity is less than the threshold value, the ROM firmware informs the operating system of the highest head number (after translation) reported by the drive. Alternatively, if a divide-by-zero error may result, the ROM firmware will inform the operating system of the highest head number (after translation) limited to a predetermined value. The ROM firmware will also limit the reported cylinder number to a value that will require no more than three bit shifts during translation. If, however, the reported capacity is greater than or equal to the threshold value, the ROM firmware reconfigures the drive to use a number of heads that is less than the number of heads the drive initially reported and limits the number of cylinders reported by the drive to a value that will not create a divide-by-zero error. In the latter situation (capacity greater than the threshold value) the computer's operating system and ROM firmware preferably implement a service (preferably extended INT 13) to permit access to the drive's full capacity. Further, the threshold is approximately 7.875 GB.

Another aspect of the invention permits a computer's operating system that cannot access the full capacity of a drive greater than 7.875 GB to fully access the first 7.875 GB of the drive. Accordingly, the ROM firmware preferably informs the operating system that the drive has 3 FFF hexadecimal (16,383 decimal) cylinders (3 FFh cylinders after translation) even though the drive has more then 3 FFF hexadecimal cylinders. This aspect of the invention solves the problem created by the translation scheme of a drive with a capacity in excess of 7.875 GB appearing to have substantially less than 7.875 GB of capacity.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of a preferred embodiment of the present invention, reference will now be made to the accompanying drawings, wherein:

FIG. 1 is a graphical representation of a hard disk drive considering limitations imposed by the computer's BIOS mechanism;

FIG. 2 is a graphical representation of a hard drive considering limitations imposed both by the computer's BIOS and the specification to which the hard drive complies;

FIG. 3a is a graphical representation of how the BIOS interprets the structure of the hard drive before translation is implemented;

FIG. 3b is a graphical representation of how the BIOS interprets the structure of the hard drive after translation is implemented;

FIG. 5 is a block diagram of a computer system in accordance with the preferred embodiment.

DETAILED DESCRIPTION OF PREFERRED EMBODIMENTS

Figure 4:
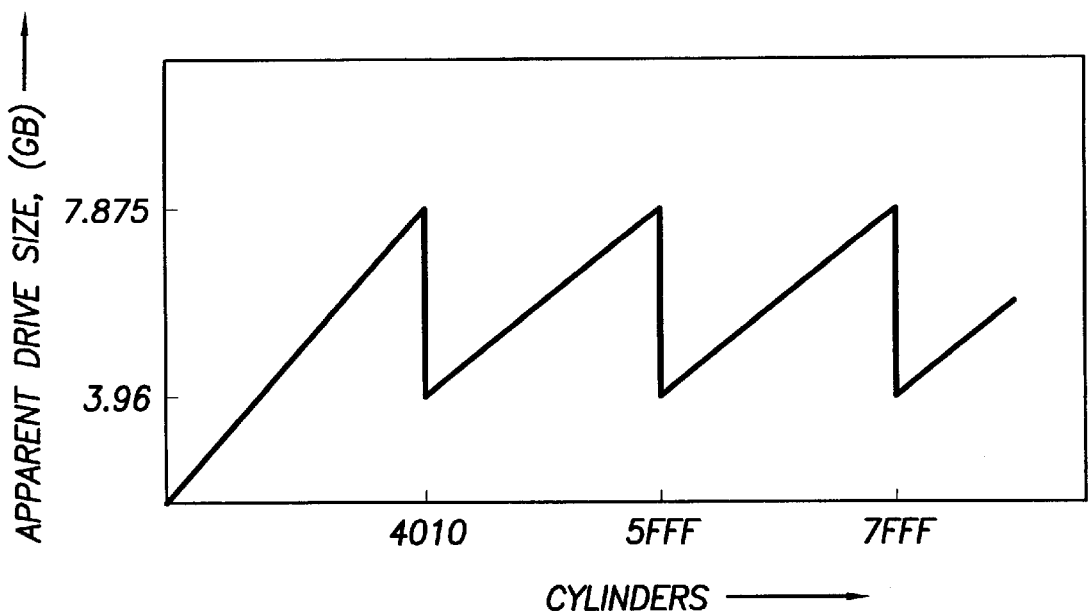
FIG. 4 illustrates the result of implementing translation for hard drives that exceed the 7.875 GB barrier.

Referring now to FIG. 5, a computer system 100 constructed in accordance with a preferred embodiment generally includes a central processing unit ("CPU") 102 coupled to a variety of system components through an integrated bridge logic (or "North bridge") unit 104. The CPU 102 couples to the North bridge logic unit 104 via a CPU bus 110. An external memory cache unit (not shown) may also be coupled to the CPU bus 110. As shown, a system memory 106 also preferably couples to the bridge logic unit 104 through a memory bus 107, and a graphics processor 108 couples to the bridge logic unit 104 through an Advanced Graphics Port ("AGP") bus 112. A display device (or monitor) 109 couples to the graphics processor 108. Additionally, one or more Peripheral Component Interconnect ("PCI") devices 116 couple to the bridge logic unit 104 through a PCI bus 114. Other standard bus protocols, besides PCI, may alternatively be used to implement bus 114. The North bridge logic 104 preferably coordinates the transfer of address, data and control signals between the various busses to which it connects. Moreover, although the North bridge logic is shown as a separate component, one skilled in the art will understand that North bridge 104 may be integrated on the same silicon as other components, such as CPU 102.

In accordance with the preferred embodiment for the computer system 100, a secondary bridge logic (or "South bridge") unit 118 also may be provided to accommodate an electrical interface to one or more peripheral devices by way of an expansion bus 120. The expansion bus 120 may be implemented using any suitable bus type such as an Industry Standard Architecture ("ISA") bus or an Extended Industry Standard Architecture bus ("EISA"). The South bridge 118 preferably functions as a bus bridge for orchestrating the transfer of address, data and control signals between two busses that implement different protocols.

In addition to providing an interface to an expansion bus, the South bridge logic 118 may further incorporate additional functionality, as desired. For example, in one exemplary embodiment, South bridge logic unit 118 includes a master PCI arbiter (not shown) for arbitrating ownership of the PCI bus 114. An arbiter grants ownership of the bus to one of multiple devices concurrently requesting access to the bus. South bridge logic unit 118 may also incorporate an interrupt controller for coordinating multiple interrupt requests to the CPU.

Referring still to FIG. 5, the CPU 102 is illustrative of, for example, a Pentium® Pro or Pentium® Pro II microprocessor. It should be understood, however, that other alternative types of microprocessors could be employed from a variety of manufacturers. Further, an embodiment of computer system 100 may include a multiple CPU architecture, with a plurality of processors coupled through the CPU bus 110 to the North bridge logic unit 104.

The system memory 106 generally includes a conventional memory device or an array of memory devices in which application programs and data are stored. The system memory 106 preferably comprises the working memory for the computer system and is used during most system operations. Computer system 100 includes any suitable type of memory such as dynamic and random access memory ("DRAM") or specialized types of DRAM devices such as synchronous dynamic random access memory ("SDRAM"). According to normal convention, banks of DRAM devices are provided in the computer system, under control of a memory controller unit in the North bridge logic 104.

The PCI peripheral device 116 may include one or more of a variety of peripheral devices such as, for example, network interface cards, video accelerators, audio cards, small computer systems interface ("SCSI") adapters and telephony cards. Although only two PCI devices 116 are included in the embodiment illustrated in FIG. 1, it should be recognized that computer system 100 may include any number of PCI devices as desired. As noted, above, other busses may be used in place of a PCI bus. In such a case, peripheral devices implementing that bus protocol would be substituted for PCI device 116.

Referring still to FIG. 5, the graphics processor 108 controls the rendering of text and images on display 109. Graphics processor 108 may embody a typical graphics accelerator generally known in the art to render three-dimensional data structures on display 109. These data structures can be effectively shifted into an out of system memory 106. The graphics processor 108 therefore may be a master of the AGP bus 112 in that it can request and receive access to a target interface within the North bridge logic unit 104 to thereby obtain access to system memory 106. A dedicated graphics bus (e.g., AGP bus) 112 accommodates rapid retrieval of data from system memory 106. Display 109 is any electronic display device upon which an image or text can be represented. A suitable display 109 may include, for example, a cathode ray tube ("CRT"), a liquid display ("LCD"), or a virtual retinal display ("VRD"), or any other type of suitable display device for a computer system.

As shown in FIG. 5, the expansion bus 120 couples a number of peripheral devices to the South bridge logic unit 118. A Basic Input/Output System (BIOS) read only memory (ROM) device 122 includes code that the computer 100 executes during boot up. The BIOS ROM 122 also includes instructions that are executed by the CPU 102 for accessing disk drives and other devices. The BIOS ROM 122 alternatively may be coupled to other buses instead, such as the CPU bus 110.

A keyboard controller 124 coupled to a keyboard 126 may also be coupled to the expansion bus 120. The keyboard controller 124 receives signals from the keyboard 126 in response to the activation of the various keys on the keyboard. The keyboard controller may interpret those signals and provide that information to the computer system 100 through the south bridge logic 118.

In accordance with one embodiment of the invention, a hard disk drive controller 128 also couples to the expansion bus 120. A hard disk drive 130 couples to the hard disk drive controller 128. The hard disk drive controller provides the interface between the hard disk drive 130 and the rest of the computer system 100. The connection between the hard disk drive controller 128 and the hard disk drive 130 preferably complies with the Advanced Technology Attachment-4 ("ATA-4") specification, (revision 17, Oct. 30, 1997) incorporated herein by reference. Thus, the hard drive 130 preferably is an ATA drive, and is commonly referred to as an Intelligent Device Electronics ("IDE") drive. Although, the preferred embodiment is described in terms of a hard disk drive, it should be recognized that the invention can be easily extended to any type of non-removable drives, such as CD ROM drives, digital video disk drives, and the like. If an alternative drive type is used, the controller 128 will have to be replaced by a suitable controller as one of ordinary skill would know.

Alternatively, the hard disk drive controller 128 may be coupled to other busses, such as PCI bus 114, within computer system 100. Similarly, the BIOS ROM 122 may also be coupled to the PCI bus 114, or any other suitable bus in the computer system. Also, the interface protocol between the hard disk drive controller 128 and the hard disk drive 130 may be in accordance with other disk drive standards besides ATA, such as the small computer systems interface ("SCSI") standard.

In accordance with the preferred embodiment of the invention, during boot up the CPU 102 begins executing instructions from the BIOS 122. One of the steps performed during this phase of the boot up process is to determine how many hard disk drives are attached to the computer system as well as the size of each drive. If the hard drive 130 is an IDE drive, the hard drive controller 128, under command by the BIOS 122, issues an Identify Device command in accordance with the ATA-4 specification. The Identify Device command is designated by a command code of ECh. In response to the Identify Device command, the hard drive 130 provides 256 words of information to the hard drive controller 128. As defined by the ATA-4 specification, word number one includes the number of cylinders, word number three includes the number of heads, and word number six includes the number of sectors per track (a "track" is generally synonymous with head) provided by the drive. Alternatively, the hard drive may report the highest numbered head, sector and cylinder to the BIOS, rather than the total number of heads, sectors, and cylinders. In any event, the drive reports values that are in some way associated with the highest numbered head, sector, and cylinder. Using these values, the BIOS or operating system can calculate the highest numbered head, sector and cylinder.

The BIOS then loads the operating system into system memory 106. Once loaded, the operating system initiates an INT 13 (or extended INT 13) request to the BIOS to ascertain the capacity of the disk drive. The BIOS 122 responds by informing the operating system of the highest numbered head, cylinder and sector of the drive.

There are least two ways to solve the divide-by-zero errors that plague some computer systems with hard drives larger than 4,032 MB. At the 4,032 MB point, the number of cylinders reported is 2000 h and translation results in 100 h heads (the highest numbered head being FFh). In accordance with a preferred embodiment, when the translated head number is 100 h, the BIOS 122 preferably informs the operating system that the last head number is FEh, rather than FFh. As explained previously, many operating systems perform byte-size calculations using the total number of heads calculated by incrementing the highest numbered head returned by INT 13. Instead of returning the highest numbered head as FFh, the preferred embodiment of the invention returns FEh as the highest head number and, thus, when incremented by one, no divide-by-zero errors occur. By reporting the last head number as FEh, one head effectively is lost out of 256 possible heads. However, this small reduction in head number results in a loss of only 1/256 or 0.39% of the disk drive's storage capacity. Limiting the highest numbered head to FEh, however, creates a non-contiguous disk space allocation problem that can be solved by implementing the LBA assisted translation method described in Enhanced BIOS services for disk drives familiar to one of ordinary skill in the art.

An alternative solution to the divide-by-zero problem has been implemented by some hard drive manufacturers. With this solution the hard drive reports only Fh heads (the last being Eh), rather than 10 h heads. In this way a drive with 4000 h cylinders (0–3FFFh addressable) will have translated maximum cylinders of 3 FFh (400 h total), maximum sectors of 3 Fh (3 Fh total), and maximum heads of EFh (F0 h total) as illustrated in Table 9 below.

TABLE 9

New drive limits if only 15d heads are reported by drive

|  | Highest addressable cylinder | Highest addressable sector | Highest addressable head |
|---|---|---|---|
| Max. before translation | 3FFFh | 3Fh | Eh |
| Max. after translation | 3FFh | 3Fh | EFh (logical) |

The highest addressable head EFh after translation will not have the roll-over problem resulting in a divide-by-zero error when calculating a drive size with 1-based byte sized math. However, with only Fh heads the maximum drive size is (4000 h cylinders)(3 Fh sectors)(Fh heads)(200 h bytes/sector)=7.383 GB. This results in a loss of capacity of (7.875−7.383)/7.875 * 100=6.25

To access drives with more than 7.875 GB of capacity, the BIOS 122 must implement the extended INT 13 functions described in the Enhanced BIOS Services for Disk Drives specification. As explained, a hard drive must report at least 10 h heads to reach beyond the 7.875 GB barrier. Reporting 10 h heads, however, may cause divide-by-zero errors during system initialization when operating systems issue a traditional INT 13 call to the BIOS 122 to retrieve the translated drive capacity. Solving the divide-by-zero problem by requiring the disk drive to report only Fh heads precludes the operating system from using the extended ST 13 service.

To resolve these two diametrically opposing requirements, the computer system 100 of the preferred embodiment implements one of the two solutions described above to solve the divide-by-zero problem for drives with less than 7.875 GB (and more than 4,032 MB). For drives that have more than 7.875 GB of capacity, the drive preferably will report 10 h heads so that the operating system will use the Extended INT 13 services to access the full capacity of the drive. However, the BIOS 122, upon identifying a drive with a capacity greater than 7.875 GB, will issue an initialize device parameters ("IDP") command in compliance with the ATA specification to the hard drive 130 to reconfigure the drive's internal translation scheme to use Fh heads, rather than 10 h heads. The BIOS will also limit the cylinder number reported by the drive to 3 FFFh which will result in only three bit shifts during translation and a head number reported to the operating system of EFh heads. Using EFh head the operating system will not cause a divide-by-zero problem.

Hard drives with capacities greater than 7.875 GB report more than 4000 h cylinders during initialization. For computers that do not include an operating system and BIOS that support extended INT 13, but have a hard drive with a capacity greater or equal to 7.875 GB, the BIOS 122 preferably limits the cylinder number reported by the drive to 3 FFFh (16,383 decimal) (3 FFh after translation). By informing the operating system that the highest addressable translated cylinder number is 3 FFh, the maximum addressable hard drive size is always (4000 h)(10 h)(3Fh)(200 h)=7.875 GB. This solution effectively places a cap at 7.875 GB; the operating system will not have access to that portion of a drive's storage capacity in the range exceeding 7.875 GB. However, the problem illustrated with respect to FIG. 4 and discussed previously (cyclical loss of capacity depending on drive size) is overcome.

Figure 6:
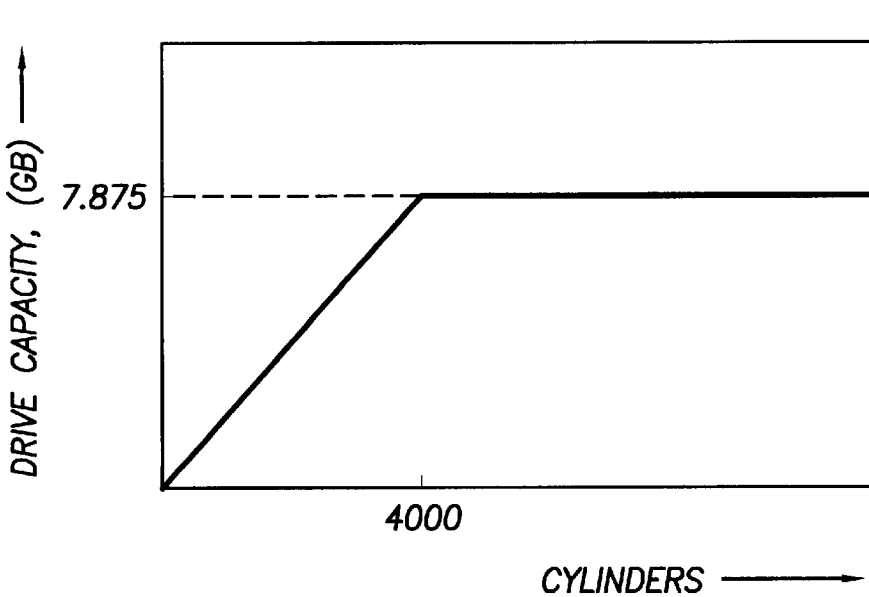
FIG. 6 illustrates the result of implementing a preferred embodiment of the invention for a hard drives that exceed the 7.875 GB.

The benefit of this solution is illustrated with respect to FIGS. 4 and 6. In FIG. 6, up until the 7.875 GB barrier, the number of cylinders reported by the disk drive 130 is used in the translation scheme described previously. Above the 7.875 GB barrier, the BIOS code limits the highest addressable cylinder to 3 FFFh in the translation scheme. That is, the BIOS code assumes 4000 h cylinders, even though the drive has more than 4000 h cylinders. Although storage capacity in excess of 7.875 GB is inaccessible to the operating system, the operating system will at least have access to 7.875 GB of the drive's capacity, rather than suffering further reductions in accessible capacity illustrated with respect to FIG. 4.

Numerous variations and modifications will become apparent to those skilled in the art once the above disclosure is fully appreciated. It is intended that the following claims be interpreted to embrace all such variations and modifications.

What is claimed is:

1. A computer system that includes a processor and a non-removable disk drive including a plurality of numbered heads in a range including a highest head number, comprising:

a disk drive controller coupled to said processor;

an operating system executed by said processor;

a display coupled to said processor; and an input device; and a non-volatile memory device including initialization code that initializes the computer system and limits the highest head number to FE hexadecimal;

wherein said disk drive is adapted to report to said initialization code a head value that is associated with the highest head number; and said initialization code informs the operating system of the disk drive's highest head number.

2. A method for initializing a computer system including a non-removable disk drive comprising a plurality of numbered heads including a highest head number and adapted to report to initialization code a head value that is associated with the highest head number, said method including:

(a) reporting the highest head number of said disk drive;

(b) limiting the highest head number reported in (a) of said disk drive to a predetermined value wherein said predetermined value is FE hexadecimal and is one less than the highest head number reported by the disk drive in (a); and (c) informing an operating system of said highest head number limited to said predetermined value.

3. A computer system that includes a processor and a non-removable disk drive including a plurality of numbered heads, said plurality of numbered heads including a highest head number, comprising:

a non-volatile memory device including initialization code and coupled to said processor;

a disk drive controller coupled to said processor for providing communication with said disk drive;

an operating system executed by said processor;

a display coupled to said processor; and an input device;

wherein said disk drive reports the total number of said heads to said initialization code and said initialization code is adapted to reconfigure said disk drive to a different number of heads and wherein said initialization code informs said operating system of the highest head number of the disk drive limited to a predetermined value if the storage capacity of said disk drive is less than a threshold value.

4. A computer system that includes a processor and a non-removable disk drive including a plurality of numbered heads, said plurality of numbered heads including a highest head number, comprising:
- a non-volatile memory device including initialization code and coupled to said processor;
- a disk drive controller coupled to said processor for providing communication with said disk drive;
- a display coupled to said processor; and
- an input device;
- wherein said disk drive reports Fh heads to said initialization code if the storage capacity of said disk drive is less than a threshold value.

5. The computer system of claim 4 wherein said initialization code reconfigures said hard drive to a number of heads that is less than the number of heads reported by said disk drive if the capacity of said disk drive is greater than or equal to said threshold value.

6. The computer system of 5 wherein said initialization code reconfigures said hard drive to use OF hexadecimal heads if the capacity of said disk drive is greater than or equal to said threshold value.

7. The computer system of 5 wherein said threshold value is approximately 7.875 gigabytes.

8. A method for initializing a computer system including a non-removable disk drive comprising a plurality of heads with a highest head number, said method including:
- (a) reporting the number of heads of said disk drive; and
- (b) reconfiguring said disk drive to use a different number of heads than that reported in (a) if the storage capacity of said disk drive is greater than or equal to a threshold value.

9. A method for initializing a computer system including a non-removable disk drive comprising a plurality of heads with a highest head number, said method including:
- (a) reporting the number of heads of said disk drive as Fh; and
- (b) reconfiguring said disk drive to use a different number of heads than that reported in (a) if the storage capacity of said disk drive is greater than or equal to a threshold value.

10. The method of claim 8 further including limiting the highest head number to a predetermined value if the storage capacity of the disk drive is less than the threshold value.

11. A method for initializing a computer system including a non-removable disk drive comprising a plurality of heads with a highest head number, said method including:
- (a) reporting the number of heads of said disk drive; and
- (b) reconfiguring said disk drive to use a different number of heads than that reported in (a) if the storage capacity of said disk drive is greater than or equal to a threshold value; and
- (c) limiting the highest head number to a predetermined value if the storage capacity of the disk drive is less than the threshold value wherein the predetermined value is the highest head number minus 1.

12. The method of claim 9 wherein said threshold value is approximately 7.875 gigabytes.

13. The method of claim 12 wherein (c) includes reconfiguring said hard drive to use OF hexadecimal heads if the capacity of said disk drive is greater than or equal to said threshold value.

14. A computer system that includes a processor and a non-removable disk drive including a plurality of numbered heads and cylinders, comprising:
- a non-volatile memory device including initialization code coupled to said processor;
- a disk drive controller coupled to said processor for providing communication with said disk drive;
- a display coupled to said processor; and
- an input device;
- wherein said disk drive reports to said initialization code a cylinder value that corresponds to a highest numbered cylinder and said initialization code informs an operating system of the highest numbered cylinder limited to a predetermined value that is approximately 3 FFF hexadecimal.

* * * * *